(12) United States Patent  
Bammer et al.

(10) Patent No.: US 8,848,977 B2  
(45) Date of Patent: Sep. 30, 2014

(54) METHOD FOR OPTICAL POSE DETECTION

(75) Inventors: Roland Bammer, Stanford, CA (US); Christoph Forman, Oberasbach (DE); Murat Aksoy, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 13/134,703

(22) Filed: Jun. 15, 2011

(65) Prior Publication Data

US 2012/0121124 A1 May 17, 2012

Related U.S. Application Data

(63) Continuation-in-part of application No. 12/928,733, filed on Dec. 17, 2010, now abandoned.

(60) Provisional application No. 61/335,319, filed on Jan. 4, 2010.

(51) Int. Cl.
*G06K 9/00* (2006.01)
*G06T 7/20* (2006.01)
*G06T 7/00* (2006.01)
*G06K 9/32* (2006.01)

(52) U.S. Cl.
CPC ..... *G06K 9/3216* (2013.01); *G06T 2207/10108* (2013.01); *G06T 7/204* (2013.01); *G06T 2207/10104* (2013.01); *G06T 2207/10088* (2013.01); *G06T 7/0044* (2013.01); *G06T 2207/10081* (2013.01); *G06T 2207/30016* (2013.01)
USPC ........................................................ 382/103

(58) Field of Classification Search
None
See application file for complete search history.

(56) References Cited

U.S. PATENT DOCUMENTS

| 5,936,722 A | 8/1999 | Armstrong et al. |
| 5,936,723 A | 8/1999 | Schmidt et al. |
| 6,384,908 B1 | 5/2002 | Schmidt et al. |
| 7,498,811 B2 | 3/2009 | MacFarlane et al. |

(Continued)

FOREIGN PATENT DOCUMENTS

WO    WO 2009/129457    10/2009

OTHER PUBLICATIONS

Fiala, Mark. "Comparing artag and artoolkit plus fiducial marker systems." Haptic Audio Visual Environments and their Applications, 2005. IEEE International Workshop on. IEEE, 2005.*

(Continued)

*Primary Examiner* — Stephen R Koziol
*Assistant Examiner* — Amandeep Saini
(74) *Attorney, Agent, or Firm* — Lumen Patent Firm

(57) ABSTRACT

The tracking and compensation of patient motion during a magnetic resonance imaging (MRI) acquisition is an unsolved problem. A self-encoded marker where each feature on the pattern is augmented with a 2-D barcode is provided. Hence, the marker can be tracked even if it is not completely visible in the camera image. Furthermore, it offers considerable advantages over a simple checkerboard marker in terms of processing speed, since it makes the correspondence search of feature points and marker-model coordinates, which are required for the pose estimation, redundant. Significantly improved accuracy is obtained for both phantom experiments and in-vivo experiments with substantial patient motion. In an alternative aspect, a marker having non-coplanar features can be employed to provide improved motion tracking. Such a marker provides depth cues that can be exploited to improve motion tracking. The aspects of non-coplanar patterns and self-encoded patterns can be practiced independently or in combination.

17 Claims, 9 Drawing Sheets

(56) References Cited

U.S. PATENT DOCUMENTS

| | | |
|---|---|---|
| 7,925,326 B2 | 4/2011 | Siegel et al. |
| 2004/0171927 A1 | 9/2004 | Lowen et al. |
| 2005/0054910 A1 | 3/2005 | Tremblay et al. |
| 2005/0283068 A1 | 12/2005 | Zuccolotto et al. |
| 2006/0269114 A1* | 11/2006 | Metz .............................. 382/131 |
| 2007/0280508 A1 | 12/2007 | Ernst et al. |
| 2008/0317313 A1 | 12/2008 | Goddard et al. |
| 2009/0209846 A1 | 8/2009 | Bammer |

OTHER PUBLICATIONS

Forman, Christoph, et al. "Self-encoded marker for optical prospective head motion correction in MRI." Medical Image Computing and Computer-Assisted Intervention—MICCAI 2010. Springer Berlin Heidelberg, 2010. 259-266.*

* cited by examiner

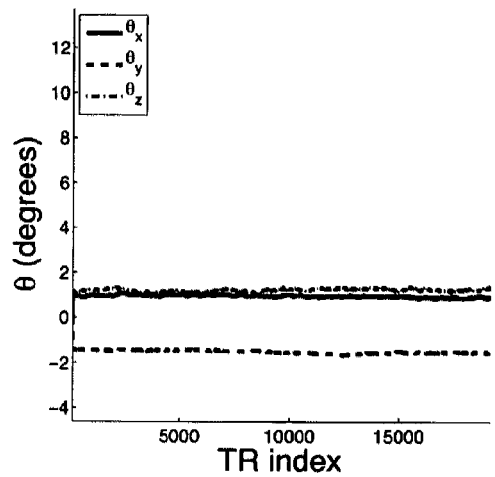 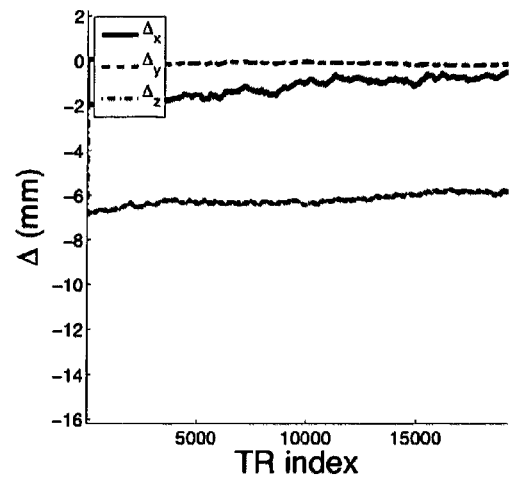
Fig. 4a  Fig. 4b
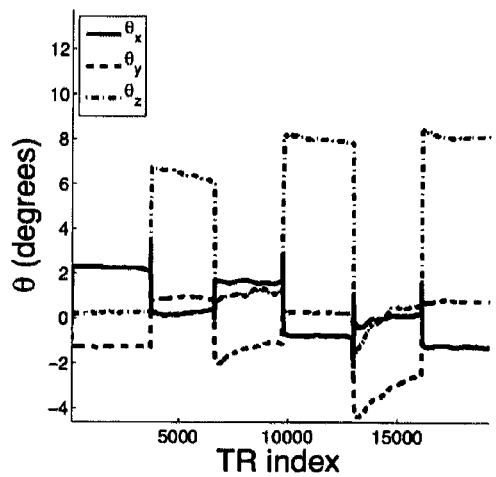 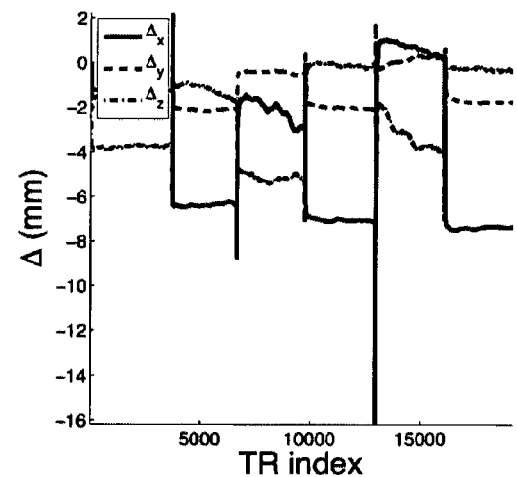
Fig. 5a  Fig. 5b

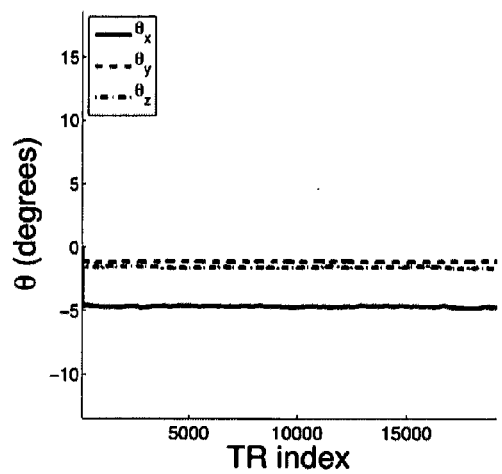 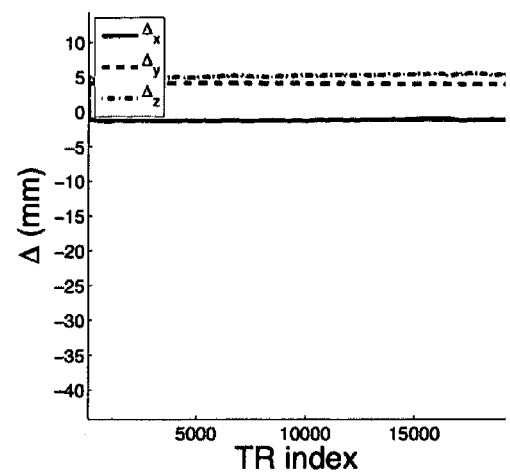
Fig. 9a                              Fig. 9b
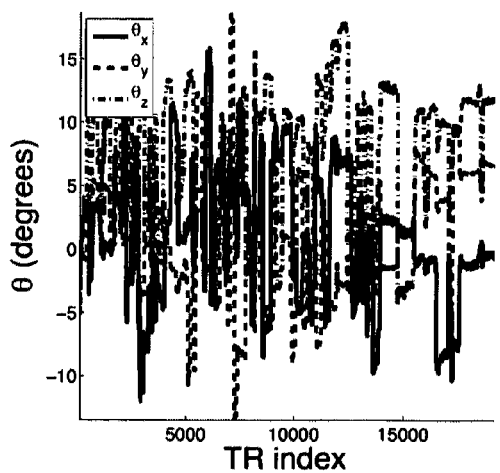 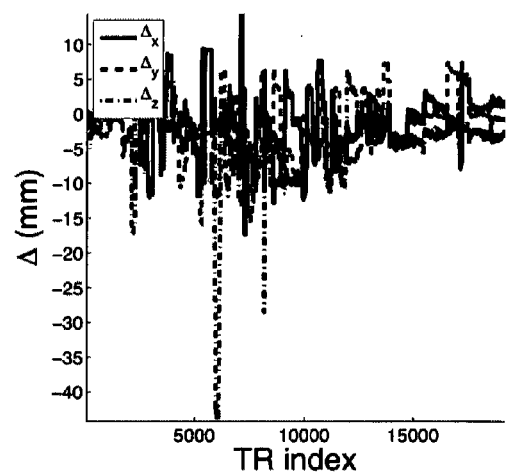
Fig. 10a                             Fig. 10b

METHOD FOR OPTICAL POSE DETECTION

CROSS REFERENCE TO RELATED APPLICATIONS

This application is a continuation in part of U.S. application Ser. No. 12/928,733, filed on Dec. 17, 2010 now abandoned, entitled "Method for optical pose detection", and hereby incorporated by reference in its entirety. Application Ser. No. 12/928,733 claims the benefit of U.S. provisional patent application 61/335,319, filed on Jan. 4, 2010, entitled "Method for optical pose detection", and hereby incorporated by reference in its entirety.

BACKGROUND

Motion is still an unsolved problem in Magnetic Resonance Imaging (MRI), as well as other imaging modalities, and is a dominant source of artifacts. Motion can result in prolonged or diagnostically inadequate studies. This can lead to considerably lower diagnostic confidence or even incorrect diagnoses. To overcome motion in some cases requires the use of sedation or general anesthesia, which can add extra risk factors to a diagnostic patient work-up. Moreover, the decreased patient comfort and through-put is inconvenient for both the patient and the clinicians, and can add significantly to overall exam/health care costs. Providing an accurate and reliable marker for 3D motion tracking is key for many prospective or retrospective motion correction approaches.

Using two or more cameras, the position of a 3D marker in space can be determined via epipolar geometry. Similarly, a single camera can be used to determine the position of a marker of known geometry. A limitation of these approaches is that the pose estimation fails if only part of the marker is visible, such as in case of large pose changes or when the view to the marker is partially obstructed. Furthermore, the image quality (lens distortion, focus) has to be similar across the entire field of view (FOV), or for all positions in 3D space where the marker is placed. For large motion or large camera apertures, this can become problematic and both precision and accuracy of pose estimation can be considerably impaired.

SUMMARY

To overcome these limitations we have developed a radically different marker design. Here, in addition to the normal features used in optical motion tracking (e.g. checker-board for facilitated edge detection with a single-camera approach), the marker has the location of each feature imprinted on it. Thus, even by looking at only a subset of the entire marker, the relative position of this feature is known and therefore the position of the entire marker in 3D can be determined. This approach can provide reduced tracking errors due to geometric distortions introduced along the optical chain and excessive pose changes. Alternatively and/or in combination, as described in greater detail below, a non-planar marker having two or more planar subsurfaces can be employed to provide depth cues to improve pose estimation.

One implementation of this position self-encoding is, for example, printing a 2D binary-type, machine-readable code on some or all quads of a checkerboard. In this fashion, the code allows one to determine the relative position of each coded quad on the checkerboard. One way to do that is to use a look-up table to associate each quad code with its position on the marker. Using this approach, only a few quads need to be found (i.e. when using a limited FOV camera) to uniquely identify the absolute marker position. Similarly, the FOV can be limited on purpose to allow greater immunity against large pose changes as well as geometric distortions and focal errors.

To increase robustness, it is preferred to use a rotational-invariant code for encoding the checkers. That is, the identification of the quad is unique and independent from the relative orientation between camera and marker. Another way of expressing this point is that it is preferred for the code shapes to be selected such that rotations do not introduce ambiguity between any two codes. For example, one preferably would not include both a "C" shape and a "U" shape in the codes, because rotation can introduce ambiguity between the "C" code and the "U" code.

Improved 3D pose estimation and real-time motion tracking as provided by the present approach has many applications. One important application of this approach is medical imaging. The system has been implemented and tested on a Magnetic Resonance Imaging (MRI) scanner. Other medical imaging modalities, such as Positron Emission Tomography (PET), Computed x-ray Tomography (CT), Single Photon Emission Computed Tomography (SPECT), and the like would also be potential fields of application. Since a major advantage of this approach is to provide pose estimation when there is only limited view to monitor the marker or when the line of sight between camera and marker is obstructed, an important field of application will be situations where this occurs (e.g. medical imaging with small MRI receiver coils). Aside from medical imaging, 3D pose tracking finds utility in other applications, such as computer games, aviation, and film making. The self-encoded marker can be easily adapted for individual pose tracking needs and to improve tracking robustness and reliability also for these disciplines.

The present approach provides significant advantages. Various conventional optical methods to determine 3D pose are known. These approaches differ mainly in how many cameras need to be used and by the geometric shape of the marker. Conventional approaches typically assume that the marker is entirely within the camera FOV, which has three major disadvantages: first, for a large FOV the lens distortions can impair pose estimation; second, a marker that is oblique to the camera plane and requires a large FOV can be partially out of focus, which puts more demand on the optical chain; third, excessive motion—where part of the marker leaves the camera FOV—can not be tracked.

The present approach overcomes the above-described limitations by:
(i) requiring only a much smaller fraction of the FOV to be in focus,
(ii) being able to detect pose even from only a subset of the entire marker image, and thus
(iii) allowing much larger pose changes, which overall increases accuracy and precision of pose estimation, or 'key hole' approaches.

Increased pose detection accuracy and/or precision can be provided over a larger range of pose changes.

Several variations are possible. These may include variations in:
a) the number of cameras used and their geometrical arrangement;
b) the specific geometric shape of the marker;
c) the specific encoding imprinted on the marker for relative position encoding on the marker; and/or
d) the specific algorithms used to decode position on the marker and to estimate 3D pose.

BRIEF DESCRIPTION OF THE DRAWINGS

FIGS. 4a-b show rotation and translation, respectively, for a no-motion case of the first experiment.

FIGS. 5a-b show rotation and translation, respectively, for an uncorrected motion case of the first experiment.

FIGS. 9a-b show rotation and translation, respectively, for a no-motion case of the second experiment.

FIGS. 10a-b show rotation and translation, respectively, for an uncorrected motion case of the second experiment.

DETAILED DESCRIPTION

Figure 1A:
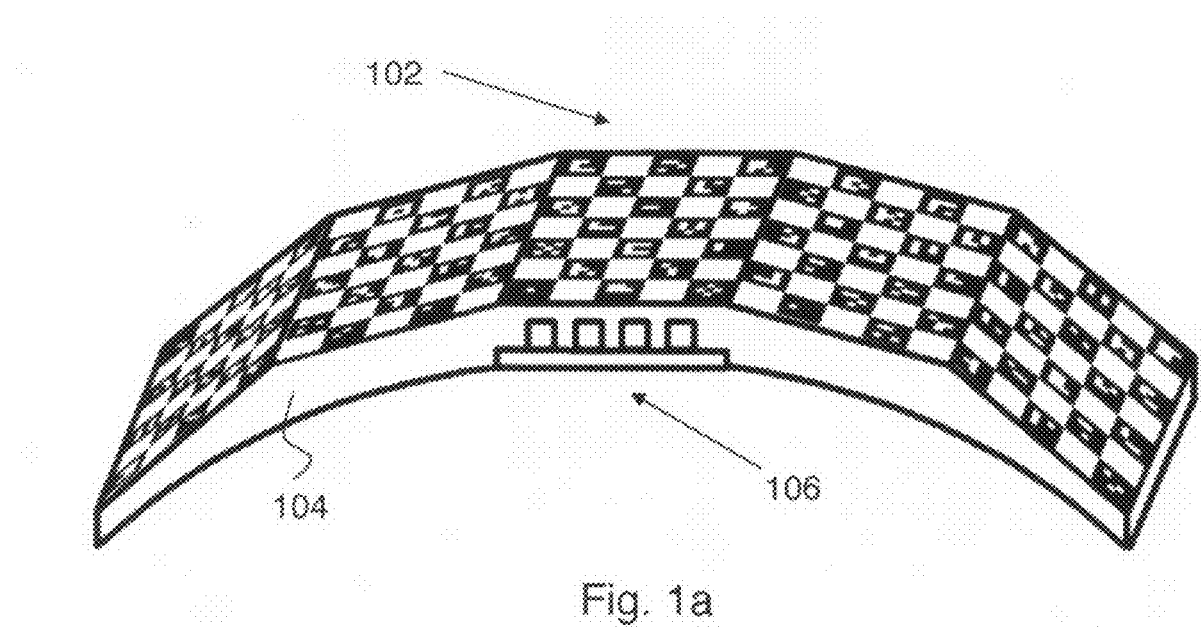
FIGS. 1a-b show a marker according to an embodiment of the invention.
Figure 1B:
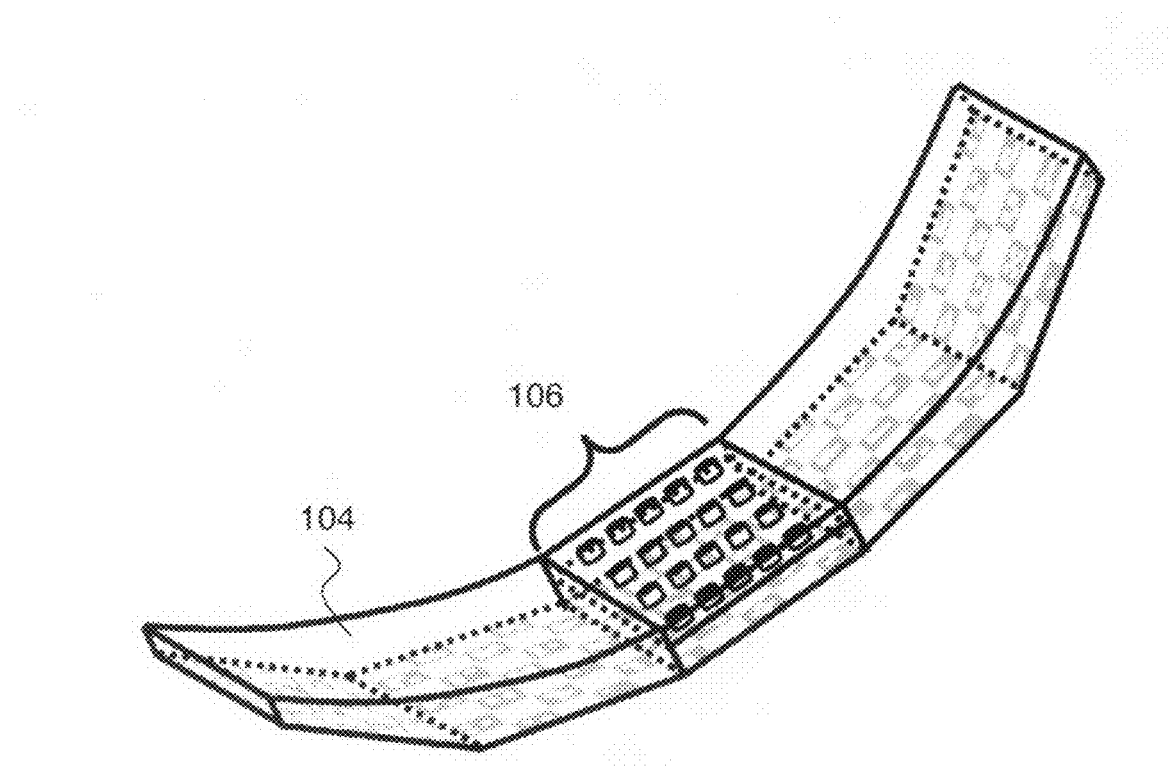
Figure 2:
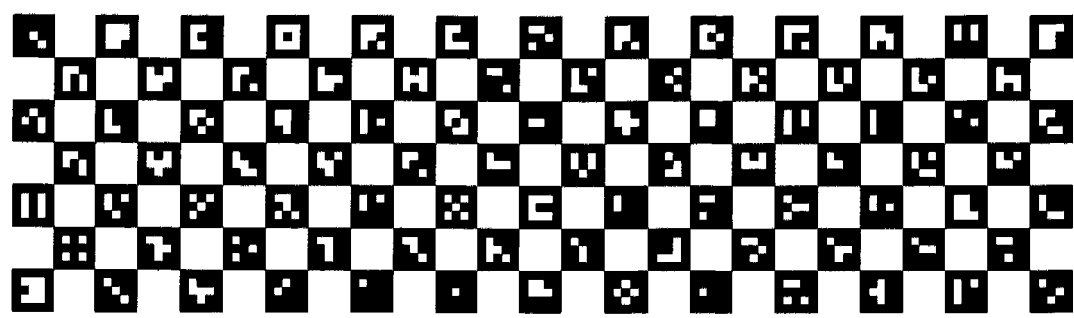
FIG. 2 shows an encoding pattern suitable for use in connection with an embodiment of the invention.

FIGS. 1a-b show a marker suitable for use in connection with embodiments of the invention. In this example, a substrate 104 (e.g., clear plastic) has a pattern 102 disposed on several surfaces of the substrate. FIG. 2 shows a close-up view of the pattern of this example. A noteworthy feature of this pattern is that no two of the quads can be brought into coincidence by a rotation (i.e., the encoding of the quads is rotationally invariant). The example of FIGS. 1a-b is configured to be disposed on the forehead of a patient. Any other convenient location for the marker can also be employed.

Another important feature of this marker is that the pattern is not all disposed in the same plane, in contrast with approaches that have all marker features in the same plane. Going out of plane in this manner can provide depth cues that assist with optical pose detection. Thus, the following possibilities exist for practicing embodiments of the invention: a) planar pattern with self encoding; b) non-planar pattern without self-encoding; and c) non-planar pattern with self-encoding (example of FIGS. 1a-b).

More specifically, non-planar markers preferably have a piecewise-planar shape (e.g., as shown on FIGS. 1a-b). Having planar surfaces facilitates lateral position determination using patterns on the planar surfaces, while having two or more planar surfaces not sharing a common plane can provide helpful 3-D depth cues for vertical position determination. Any kind of pattern can be used on the planar surfaces of a non-planar marker. Suitable patterns include, but are not limited to: position self-encoded markers as described herein, any other kind of pattern that can facilitate pose determination and identification of the planar surface pattern currently within the field-of-view of the camera (e.g., a color pattern), and retro-grade reflector (RGR) patterns (e.g., as described in U.S. Pat. No. 5,936,723).

Optionally, the marker can include one or more wells 106 (or other features), which can be employed to facilitate cross-calibration between the optical pose recognition and other imaging modalities. For example, filling wells 106 with an agar solution can make the wells register in MR imaging, thereby facilitating cross-calibration between the optical and MR modalities. In one experimental test, such a cross-calibration could be performed in 6 seconds and with an accuracy of ±0.2° and ±0.2 mm. Preferably, wells 106 are disposed such that their locations are precisely related to pattern 102. For example, in the experimental work considered above, the wells were centered on intersection points of the checkerboard pattern. Optionally, to improve registration, these wells can be distributed all over the marker instead of just in the area shown in FIGS. 1a-b.

The motion correction system was implemented on a GE Signa 1.5 T whole body system (GE Healthcare, Milwaukee, Wis.). An MR-compatible camera is mounted on an 8 channel head coil. Infrared diodes can be attached to the camera body to illuminate the scene inside the scanner bore. An independent tracking computer processes the captured camera images. The patient's pose at the beginning of each scan serves as initial point of reference to describe the motion throughout the scan. For each camera image, the detected motion of the optical system is transformed into motion which actually occurred in the scanner image plane. This requires an initial cross-calibration of the tracking system with the MR scanner. The pose updates in form of translation and rotation are relative to the patient's initial position at the first data acquisition. They are sent in real-time via network connection to the MR sequencer. Assuming rigid head motion, these updates are directly used by the sequencer to adjust the gradients and radio frequencies before each data acquisition. That way, the slice position and orientation is determined by scanned anatomy and not by the scanner geometry. Once a large difference in rotation or translation between two subsequent pose updates was detected, the current acquisition data was disregarded and repeated to compensate for the latency of the entire scan.

The basis of the self-encoded marker is a checkerboard pattern. Adjacent corners of neighboring quads on this pattern describe the feature points of this marker. For the checkerboard marker, features have point correspondences of detected feature points in the camera image and their model coordinates in the marker-model geometry. Within the black quads of the self-encoded marker, 2-D barcodes are embedded. These unique codes identify each feature of the pattern, specify its position on the marker geometry and consequently define the aforementioned point correspondences. We are using a 10 bit encoding. Instead of verifying each quad independently, we compare the recognized code of each quad and its neighboring quads with a map containing all positions of the codes on the marker. That way, every bit of the embedded code can be used for the encoding, which leads to a more robust detection of the marker in the in-bore camera image. Based on the defined point correspondences and the known intrinsic camera parameters, the marker pose is estimated by homography (planar checkerboard marker) or direct linear transformation (3-D self-encoded marker). Even if only parts of the self-encoded marker are visible to the camera, its pose can still be determined. Furthermore, different feature points of the self-encoded marker can be used for a robust tracking of the marker position and orientation. That way, we overcome the limitation of the checkerboard marker to the camera's FOV.

For the pose estimation of the marker, first, the captured camera image is converted into a binary image by thresholding. The outline of the black quads is detected by quadrangular contours in this image. Using the boundary of each quad we sample the interior into a 5×5 grid. Then, the embedded code in the inner 3×3 cells is classified by thresholding into a binary code. By means of a-priori knowledge of the marker layout, the recognized codes are verified as mentioned above. That way, erroneous detected quads can be eliminated. Finally, the relative pose of the marker to the camera is estimated using the point correspondences of detected features and marker-model points.

Phantom and in-vivo experiments were performed using an axial 3D spoiled gradient recalled (SPGR) sequence with TR=9.5 ms, TE=4.1 ms, flip angle=20°, slice thickness=1.5 mm, FOV=24 cm, and a resolution of 192×192×96.

Phantom Experiment

We evaluated the accuracy of the optical motion correction system with a cylindrical phantom and two subsequent MRI scans. In-between both scans, the static phantom was manually rotated about its principal axis by 18°. The first scan used as a reference, was compared to the motion corrected second scan. Assuming an ideal motion correction system, we expected an identical image of the phantom in both scans. We performed this experiment with both markers. The difference images indicate a discrepancy of the structure at the top of the phantom, which is caused by the phantom being not completely filled with water. While the structure of the phantom was rotated, the water remained at the same position. For quantitative evaluation of the residual mismatch, retrospective rigid registration was performed. This registration resulted in a remaining offset of:

$$t_{self\text{-}encoded}=(-0.36, 0.10, -0.39) \text{ [mm]}$$

$$r_{self\text{-}encoded}=(0.11, 0.00, 0.15)[°]$$

$$t_{checkerboard}=(0.89, 0.09, -0.79) \text{ [mm]}$$

$$r_{checkerboard}=(-0.35, -0.03, -0.29)[°]$$

It is apparent that the self-encoded marker provides significantly less error than the checkerboard marker for this phantom experiment.

In-Vivo Experiments

In-vivo experiments were performed on a healthy volunteer to evaluate the position estimates of the self-encoded marker for motion correction. For each scan, the obtained pose estimates relative to the initial head position were recorded in a log file.

In the first experiment, the pose estimates of the reference checkerboard marker and the novel self-encoded marker were compared. Four scans were obtained for this experiment. In order to track the head motion during data acquisition, first the checkerboard marker was attached to the forehead. In the first scan, the volunteer was instructed to maintain a stationary head position to create a motion-free reference image. For the following scans, the subject was asked to perform a similar head rotation every 30 seconds in order to assure a comparable motion pattern. In the second scan, the motion-correction system was turned off and the position estimates of the checkerboard marker were recorded.

Figure 3A:
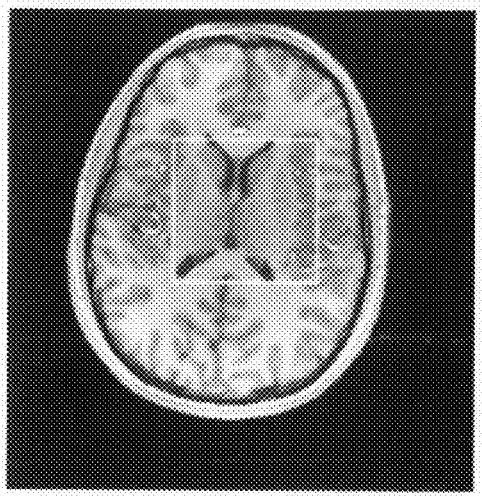
FIGS. 3a-d show images from a first experiment relating to the invention.
Figure 3B:
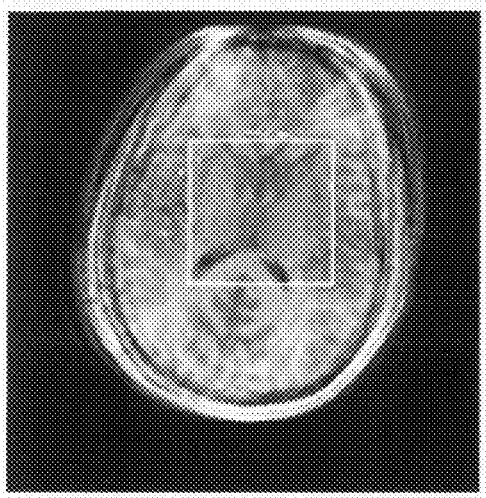
Figure 3C:
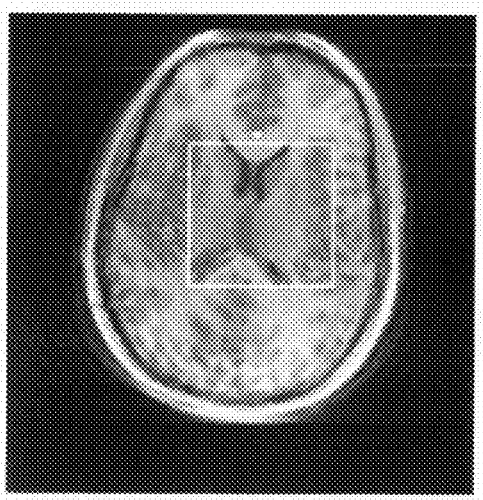
Figure 3D:
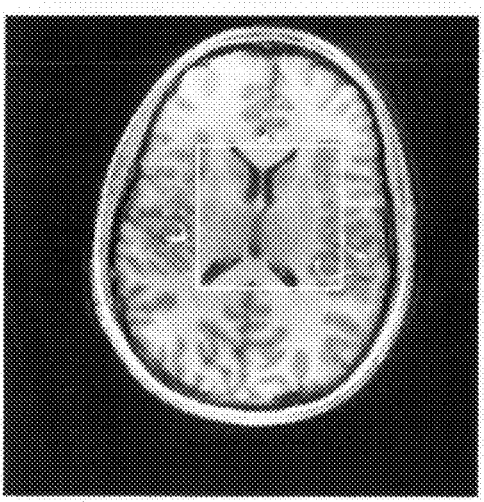
Figure 6A:
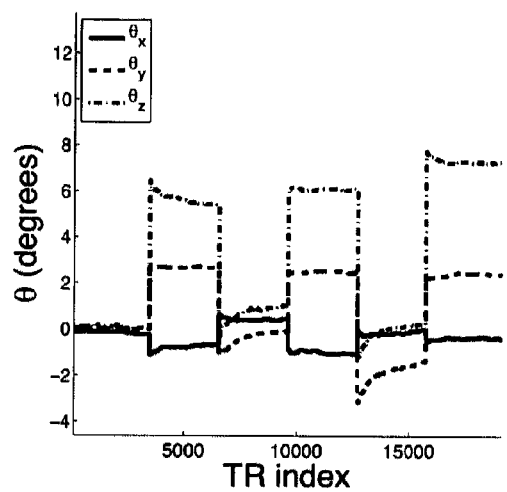
FIGS. 6a-b show rotation and translation, respectively, for a motion-corrected (checkerboard marker) case of the first experiment.
Figure 6B:
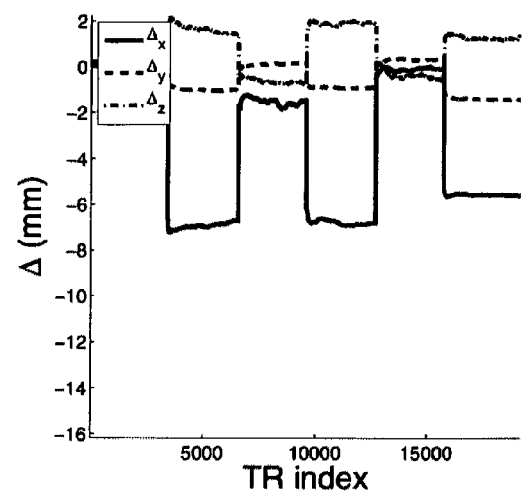
Figure 7A:
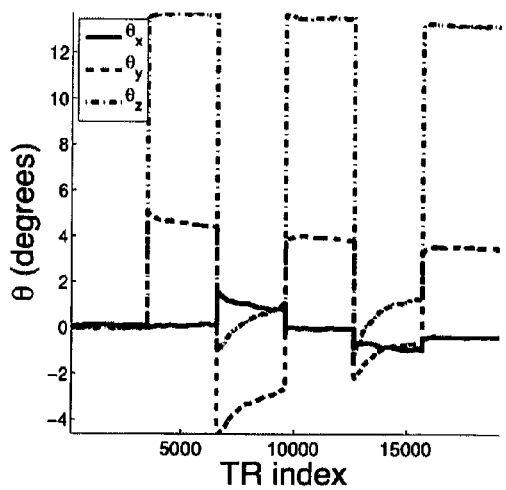
FIGS. 7a-b show rotation and translation, respectively, for a motion-corrected (self-encoded marker) case of the first experiment.
Figure 7B:
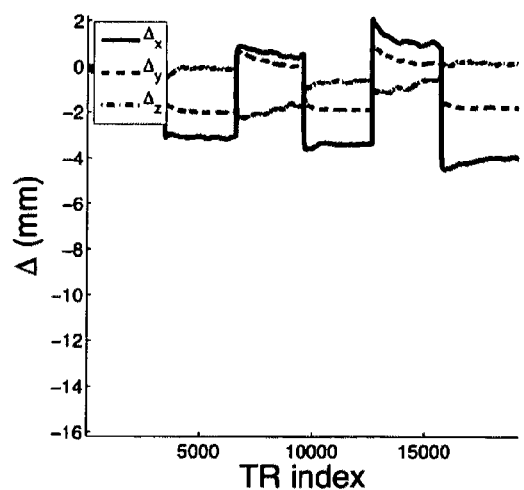

The obtained pose updates of this marker were used in the third scan to adapt the scanner for motion, while in the last scan the self-encoded marker was attached to the forehead to track the volunteers head motion. FIGS. 3a-d shows the resulting images of the performed scans. More specifically, FIG. 3a shows the no-motion image, FIG. 3b shows the uncorrected motion image, FIG. 3c show the image for motion correction with a checkerboard marker, and FIG. 3d shows the image for motion correction with the 3-D self-encoded marker. Corresponding quantitative results are shown on FIGS. 4a-b (no motion), FIGS. 5a-b (uncorrected motion), FIGS. 6a-b (correction with checkerboard marker), and FIGS. 7a-b (correction with 3-D self-encoded marker).

Without correction, the MRI images exhibited motion artifacts. Using the pose updates of the checkerboard marker, these artifacts were reduced. However, inaccuracies of the marker became apparent in a mismatch of the scanned anatomical structure. In this camera setup the tracking range of the checkerboard marker was restricted to 6°. The self-encoded marker was able to extend it to a head rotation of 13°, which is maximal without touching the coil. The improvement in accuracy of the self-encoded marker compared to the checkerboard marker was measured by Pearson's correlation coefficient. Whereas the correlation of reference and motion-corrupted image resulted in a coefficient of 0.908, the optical tracking system using the pose updates of the checkerboard marker improved this value to 0.936. Using the self-encoded marker for the tracking of the volunteer showed a correlation of 0.971.

In the second experiment, the volunteer was asked to simulate an uncooperative behavior. First, a reference image was acquired. Then, in the following scans, the volunteer performed a random trembling motion for the entire scan. The pose estimates of the self-encoded marker were used to describe the head position over time during the data acquisitions. For the second scan, the detected translation and rotation were recorded whereas the scanner was also adapting for motion in the third scan. Due to the performed random motion, it was not possible to repeat the experiment with the identical motion pattern.

Figure 8A:
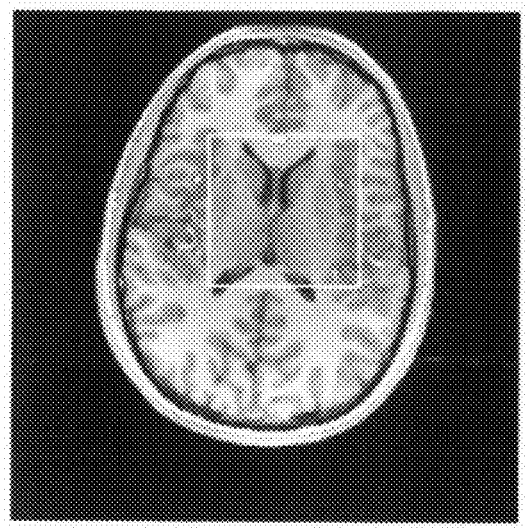
FIGS. 8a-c show images from a second experiment relating to the invention.
Figure 8B:
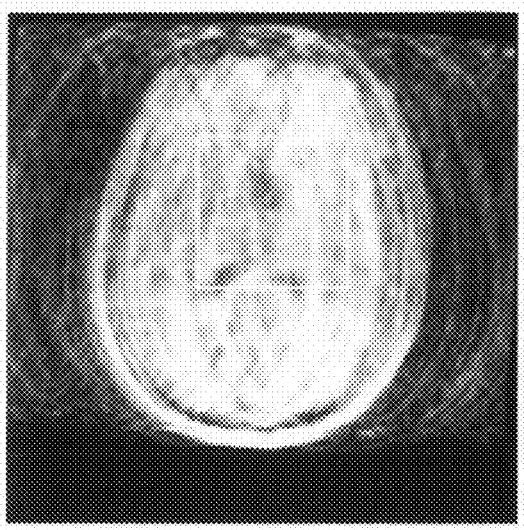
Figure 8C:
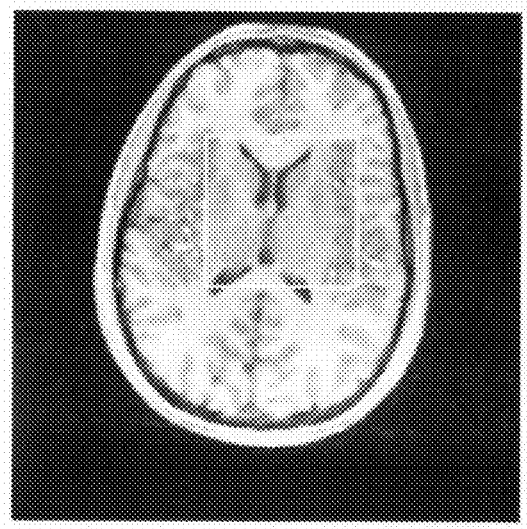
Figures 11A, 11B:
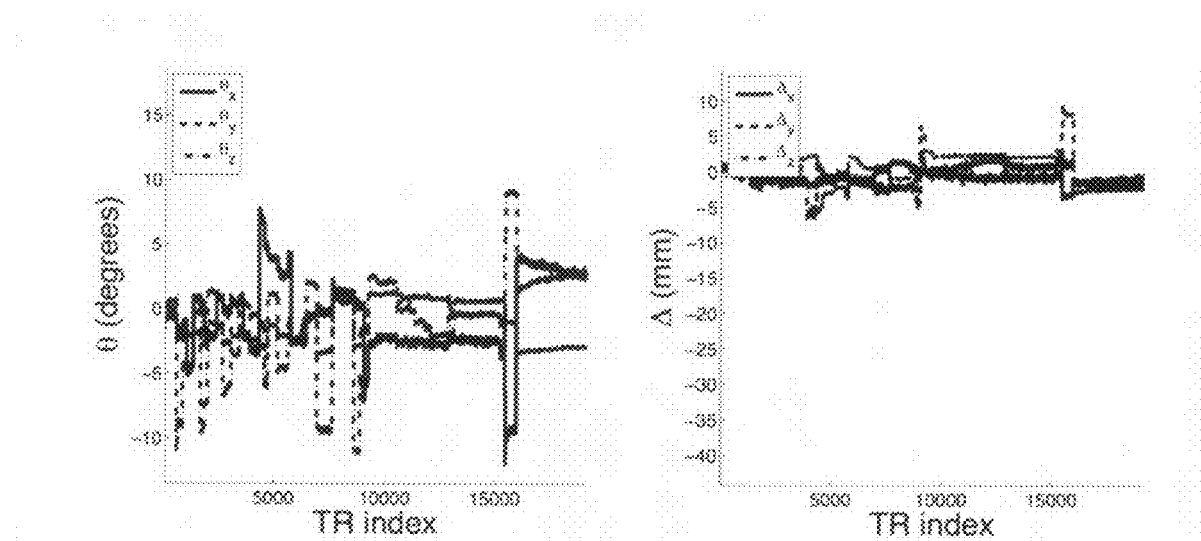
FIGS. 11a-b show rotation and translation, respectively, for a motion-corrected (self-encoded marker) case of the second experiment.

Continuous motion has a strong impact on the resulting images. FIGS. 8a-c shows the resulting images of the performed scans. More specifically, FIG. 8a shows the no-motion image, FIG. 8b shows the uncorrected motion image, and FIG. 8c shows the image for motion correction with the 3-D self-encoded marker. Corresponding quantitative results are shown on FIGS. 9a-b (no motion), FIGS. 10a-b (uncorrected motion), and FIGS. 11a-b (correction with 3-D self-encoded marker).

The motion induced artifacts corrupted the entire anatomical structure of the brain. While adapting the scanner geometry based on the detected head pose of the volunteer, the system was able to recover the structure of the brain. The effects of motion resulted in a correlation coefficient of 0.858, while the pose updates of self-encoded marker were able to improve this factor to 0.982.

Performance

We compared the performance of the 3-D self-encoded marker with 76 features to a planar checkerboard marker with 20 features. The captured image of the in-bore camera had a resolution of 640×480 pixel. For the analysis of the computational time the software ran on a Intel dual-core CPU (2.26 GHz). The entire process of feature detection and point correspondence search took 17.2 ms for the self-encoded marker and 28.6 ms for the checkerboard marker (acceleration factor 1.7×). Compared to a common checkerboard detection algorithm, this factor was achieved with a optimized detection of the self-encoded marker, since its outcome is not crucial for the generation of the point correspondences.

Discussion

A crucial limitation of existing in-bore tracking systems for prospective motion correction in MRI is the narrow FOV of the camera. In this study, we introduced a novel marker design with embedded 2-D barcodes that identify each feature on the pattern. Recognizing these codes in the captured camera image the tracking algorithm is able to estimate the pose of the self-encoded marker in situations where the marker is only partly visible.

We compared the accuracy of the self-encoded and checkerboard marker in a phantom experiment. The rotation of the phantom in-between two scans was compensated by the motion correction system in the second scan. Both resulting MR images were rigidly registered, which showed an improved accuracy for theself-encoded marker with a maximal offset of 0.39 mm and 0.15° for translation and rotation, respectively. In the first in-vivo experiment, we compared the pose estimates of both markers for motion correction.

This comparison study indicated the restricted range of motion that can be tracked with the checkerboard marker. The tracking range was extended from 6° with the checkerboard marker to 13° using the self-encoded marker. Furthermore, replacing the checkerboard marker with the self-encoded marker increased the correlation of the resulting motion compensated MR images from 0.936 to 0.971 compared to a motion-free reference. In case of an uncooperative patient the motion compensation based on the pose updates of the self-encoded marker was able to recover the scanned anatomical structure. The correlation of the motion compensated scan resulted in a coefficient of 0.982 compared to a reference scan without motion.

In order to provide an estimate of the patient's head position for every data acquisition step, the total latency of the prospective motion correction system must not exceed the repetition time. Although we were able to accelerate the processing time of the self-encoded marker by a factor of 1.7, there is still room for further improvements.

Further Experimental Work

1) Combined Prospective and Retrospective Correction

The preceding examples relate mainly to prospective correction, where optical pose information is provided to the MR system in real time such that MR slice orientation and placement can be updated in real time during a magnetic resonance scan. The following paragraphs in this section describe an experiment where prospective correction is compared to prospective+retrospective correction.

For prospective motion-correction, one camera was mounted on a head coil and used to track head motion. Tracking was accomplished using a checkerboard marker having a position self-encoded pattern as described above that was attached to the patient's forehead. Scanner-camera cross calibration was accomplished using agar filled holes that were attached to the marker. The pose data were estimated using an external laptop and sent back to the MR sequencer in real-time to update slice orientation and placement.

For retrospective correction, tracking data from the mono-vision system was used to divide k-space into segments within which the patient position was approximately the same. Thereafter, these segments were registered to each other using an entropy-based autofocusing criterion. Basically, each segment was rotated and translated individually until image entropy was minimum (cost-function). This, in turn, gave the sharpest image.

A 3D SPGR sequence (TR/TE=9.5/4.1, α=20°, 128×128×96 resolution, slice thickness=1.5 mm, FOV=240 mm) with adaptive motion-correction added was used to test these approaches in phantom and in-vivo experiments. For both cases, after the initial scanner-camera cross-calibration, the camera was slightly perturbed on purpose to simulate inaccuracies due to cross-calibration errors.

Figures 12A, 12B, 12C, 12D:
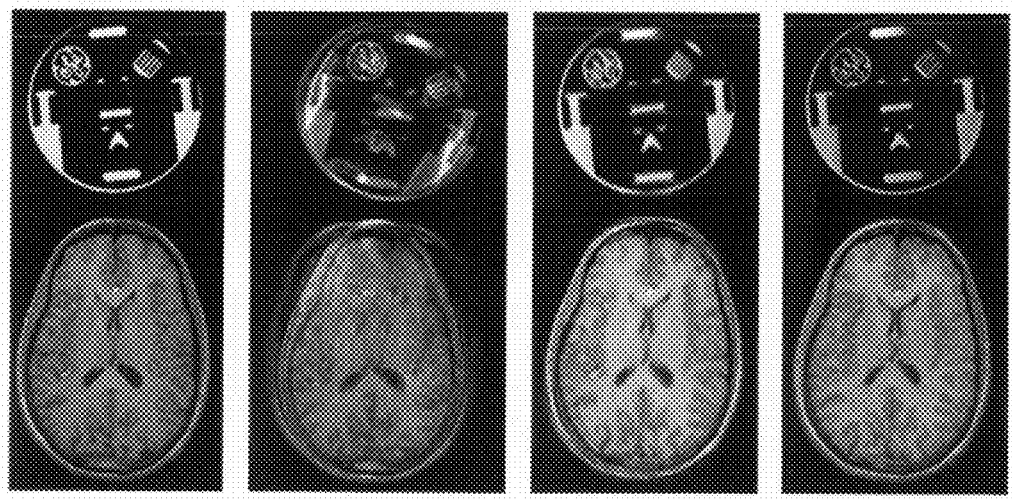
FIGS. 12a-d show images relating to combined prospective and retrospective motion correction.

FIGS. 12a-d show the results for the phantom and in-vivo experiments. Here, FIG. 12a shows the reference images, FIG. 12b shows the results for no motion correction, FIG. 12c shows the results for prospective correction alone, and FIG. 12d shows the results for combined prospective and retrospective correction. For both cases (i.e., phantom and in vivo), not running the prospective motion-correction system causes significant artifacts (FIG. 12b), which were mostly cleared out if the motion tracking was turned on (FIG. 12c). However, due to the fact that the cross-calibration between scanner-frame of reference and camera frame of reference was inaccurate, the prospectively motion corrected images showed residual artifacts. These artifacts manifested themselves as smearing in the phase-encoding direction for the phantom experiments and as double lines/ringing artifacts for the in-vivo cases. These artifacts were mostly removed after the application of entropy-based autofocusing (FIG. 12d).

In this work, we presented a system that uses prospective optical motion-correction in concert with entropy-based retrospective autofocusing to mitigate cross-calibration errors. Using prospective motion-correction eliminated largely all gross motion artifacts and, thus, helped to minimize gaps in k-space due to rotational motion. The tracking data also allowed us to segment k-space in a few segments and helped decreasing the number of motion parameters to be determined for autofocusing. So far, entropy-based autofocusing has been limited to 2D only, mostly due to the large number of unknowns in 3D acquisitions. However, using tracking data to segment k-space allowed us to apply autofocusing also in 3D. Subtle artifacts that remained after autofocusing-based artifact reduction may be due to the limitations of k-space density-compensation and gaps in k-space following rotational motion correction of individual segments which haven't been accounted for. On the other hand, k-space data with similar, but not identical motion were binned into the same group. Thus, an alternative explanation could be some uncorrected 'pose-jitter' which could be further mitigated by using a larger number of bins.

2) Time of Flight Magnetic Resonance Angiography (MRA)

Correction of motion artifacts is an ongoing challenge in MRI. Sadly, motion is often worst in patients that are acutely ill and in which time cannot be afforded to repeat failed exams. This is the case, for example, in patients suffering from acute ischemic stroke or intracranial hemorrhages. In these patients 3D Time of Flight (TOF) angiograms are often performed, but their image quality is often technically borderline or even inadequate due to profound patient motion. This, in turn, makes it often difficult to assess vessel occlusion or recanalization with sufficient confidence. Another group of patients in which TOF MRAs often fail are children.

The present approach is applicable in these challenging circumstances. External pose information is used which allows one to keep the short-TR features of the TOF intact. In-vivo results follow of a study that uses a prospective motion-correction approach as described above in connection with TOF MRA.

An MR-compatible mono-vision camera system mounted on an 8-channel receive-only head coil and was combined with a 2D geometric marker (having position self-encoding as described above), which was placed on the subject's forehead to allow tracking of head motion. The external tracking processor was running a motion detection software developed in-house, which analyzed the camera's video stream and fed the updated pose data over a high-bandwidth network connection back to the scanner's sequencer at an update rate of ~30 Hz. This allows one to adjusts in quasi-real time the prescribed TOF slab with a latency of ~50 msec between the detection of pose change and adaption played out on the scanner. To register the frame of reference of the optical arrangement with that of the MR scanner, a 30 sec semi-automatic cross-calibration was performed (3D SPGR, α=25°, FOV=12 cm, 256×256×44, NEX=2, TR/TE=5.2/1.8 msec) using a calibration phantom at the beginning of the study.

TOF Pulse Sequence:

An axial 3D spoiled gradient echo sequence (SPGR) (α=30°, FOV=24 cm, 192×192×56, TR/TE=33.8/6.8 msec, 1.4 mm slice thickness) with magnetization transfer (MT)-based tissue suppression (α=930°, 0.25 duty cycle) and a positive ramped RF excitation (TONE) pulse with support for aforementioned adaptive motion-correction was implemented on a 1.5 T GE Signa Excite unit (GE Healthcare).

Experiment:

A healthy volunteer (male, 28 y) underwent three consecutive scans each consisting of a single 7.7 cm 3D slab that covers the Circle of Willis whereby for each acquisition instructions were given to perform a specific motion pattern: (FIG. 13a) to remain still, (FIGS. 13b-c) to perform head motion as much as permitted by the coil. Instructions to change position were given via intercom to assure reproducibility between both experiments. Motion was tracked for all 3 experiments to assure that the motion of the two motion experiments were of comparable extent.

Figure 13A:
FIGS. 13a-c show images relating to motion correction in time of flight angiography.
Figure 13B:
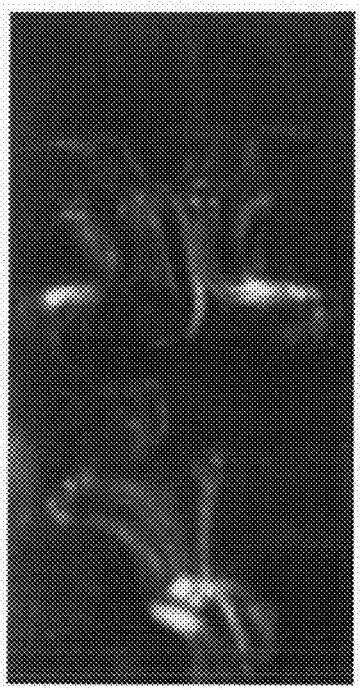
Figure 13C:

FIGS. 13a-c shows the TOF maximum-intensity-projections (MIP) that correspond to the 3 experiments. Clearly, the cut-out MIPs were best on the 'no motion' case (FIG. 13a), whilst the 'uncorrected motion' correction (FIG. 13b) was deemed technically inadequate and without any diagnostic quality. With the prospective motion correction active even for such a severe case of motion the MIPs were of excellent diagnostic quality (FIG. 13c). When compared to the 'no motion' case, the image appeared slightly blurrier but even distal branches of the anterior and posterior circulation could be well delineated on the motion-corrected scans.

The preliminary results from this study on adaptive motion-correction of 3D TOF MRA scans indicate that the present approach is very effective in correcting motion-induced artifacts. The optical tracking can detect pose changes at a very high frame rate and with great precision and accuracy. This is ideally suited for short-TR applications, such TOF MRA, and bears great potential to compensate even large-degree motion in very uncooperative patients. Further improvements in angiographic quality can be anticipated by adding further refinements such as multi slab, parallel imaging, and flow compensation.

The invention claimed is:

1. A method for estimating the pose of an object, the method comprising:
   disposing a marker on the object;
   providing two or more optical features on the marker, wherein the optical features are individually recognizable and have fixed positions on the marker, thereby defining a feature pattern having predetermined relative positions of the optical features;
   imaging part or all of the marker to provide an optical image including one or more of the features as optical imaged features, and
   determining a pose of the object using the feature pattern as seen in the optical image, in combination with a priori knowledge of the feature pattern.

2. The method of claim 1, wherein the marker is configured to be affixed to a patient, and wherein medical imaging of the patient is corrected using patient pose information derived from the determining a pose of the object.

3. The method of claim 2, further comprising performing retrospective motion correction of medical imaging data using the patient pose information after medical imaging acquisition.

4. The method of claim 2, wherein the medical imaging is motion corrected using the patient pose information during medical imaging acquisition.

5. The method of claim 2, wherein the marker further includes non-optical features which can be imaged by a medical imaging modality to provide a non-optical image of the non-optical features.

6. The method of claim 5, further comprising registering medical imaging data to the patient pose information using the non-optical image.

7. The method of claim 1, wherein the optical image includes some but not all of the optical features.

8. The method of claim 1, wherein the optical features have shapes such that feature identification does not depend on the orientation of the marker relative to a camera that provides the optical image.

9. The method of claim 1, wherein the feature pattern comprises a checkerboard arrangement of the optical features, wherein the optical features touch each other at their corners, and wherein each of the optical features is uniquely encoded.

10. A method for estimating the pose of an object, the method comprising:
    disposing a marker on the object;
    providing two or more optical features on the marker, wherein the optical features are not all disposed in a common plane, and wherein the optical features are individually recognizable and have fixed positions on the marker, thereby defining a feature pattern having predetermined relative positions of the optical features;
    imaging part or all of the marker to provide an optical image including one or more of the features as optical imaged features, and
    determining a pose of the object using at least one depth cue provided by the optical imaged features as seen in the optical image, in combination with a priori knowledge of the feature pattern.

11. The method of claim 10, wherein the marker is configured to be affixed to a patient, and wherein medical imaging of the patient is corrected using patient pose information derived from the determining a pose of the object.

12. The method of claim 11, further comprising performing retrospective motion correction of medical imaging data using the patient pose information after medical imaging acquisition.

13. The method of claim 11, wherein the medical imaging is motion corrected using the patient pose information during medical imaging acquisition.

14. The method of claim 11, wherein the marker further includes non-optical features which can be imaged by a medical imaging modality to provide a non-optical image of the non-optical features.

15. The method of claim 14, further comprising registering medical imaging data to the patient pose information using the non-optical image.

16. The method of claim 10, wherein the features have shapes such that feature identification does not depend on the orientation of the object relative to a camera that provides the image.

17. The method of claim 10, wherein the marker has a piecewise planar surface including two or more planar sub-surfaces not disposed in a common plane, and wherein the optical features are disposed on the planar sub-surfaces.

* * * * *